Oct. 30, 1956   E. GUINET   2,768,762
SEALING MEMBERS OR ELEMENTS
Filed Oct. 1, 1952   2 Sheets-Sheet 1
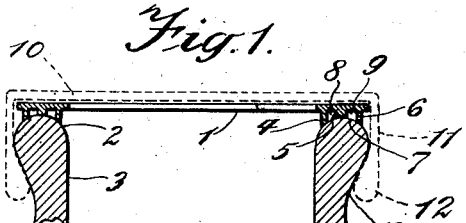
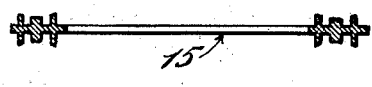
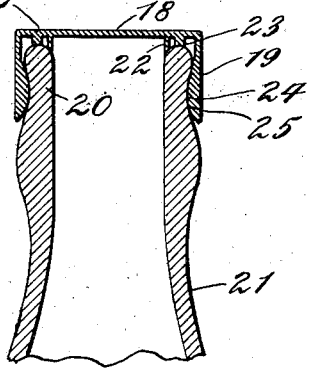
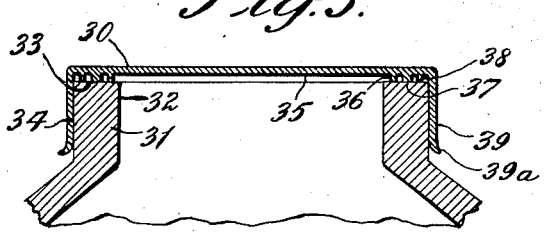
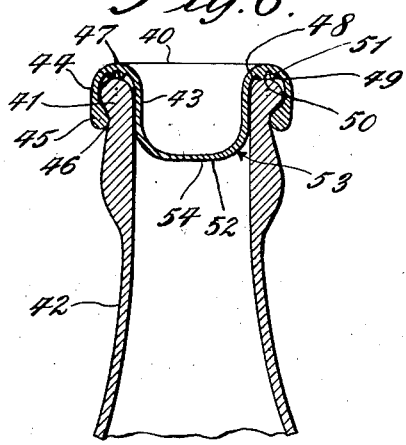
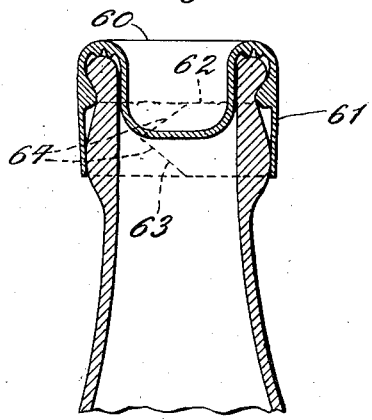
INVENTOR.
Eugene Guinet
BY
Burgess, Ryan + Hicks Oct. 30, 1956   E. GUINET   2,768,762
SEALING MEMBERS OR ELEMENTS
Filed Oct. 1, 1952   2 Sheets-Sheet 2
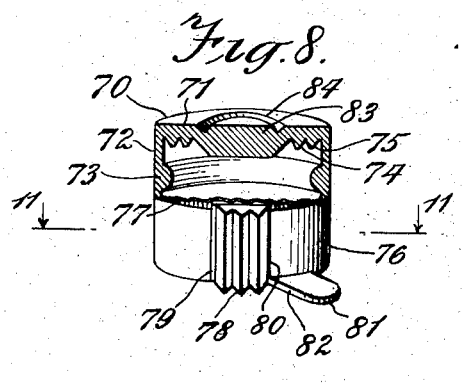
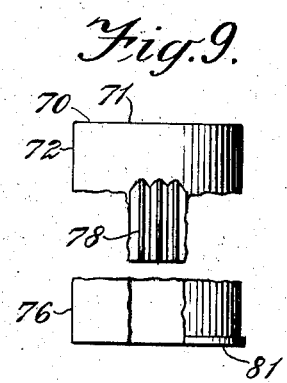
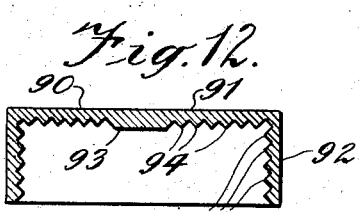
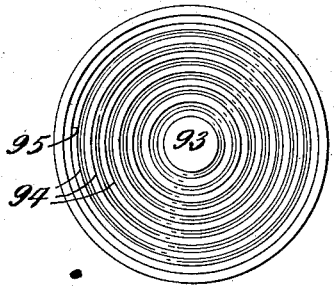
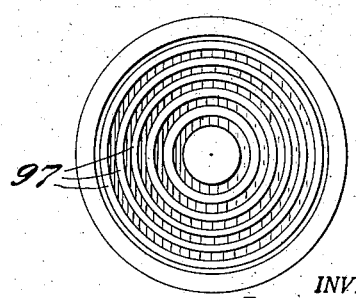
INVENTOR.
Eugene Guinet
BY
Burgess, Ryan + Hicks 2,768,762

SEALING MEMBERS OR ELEMENTS

Eugene Guinet, Lyon, France, asignor to William Herter, Paris, France

Application October 1, 1952, Serial No. 312,616

1 Claim. (Cl. 215—41)

This invention relates to sealing members or elements for bottles and other containers or receptacles having an opening defined by an annular wall.

A principal object of the invention is to provide improved sealing members or elements for producing a tight seal for the bottle or container, thus preventing material from leaving or entering the container. Other objects and advantages will appear hereinafter.

Broadly speaking, the invention comprises a resilient and flexible sealing member or element for a container having an opening defined by an annular wall, which member comprises a part which extends transversely of the opening and which seats on the top surface of the annular wall of the container. On its under side the part has a plurality of concentric annular projections or lips which make contact with the top surface of the annular wall. At least the contact-making edge portions of these projections or lips are of such resilience and/or compressibility as to follow perfectly the contours of the top wall surface and thus provide a tight seal between the said surface and the projections or lips.

The invention will be better understood from a consideration of the accompanying drawings, in which:

Fig. 1 is a cross-sectional view of a sealing member comprising an annular ring;

Fig. 2 is a cross-sectional view of a modification of Fig. 1;

Fig. 3 is a cross-sectional view of a sealing member comprising a disc;

Fig. 4 is a cross-sectional view of a cap or capseal seated on the neck of a bottle or container;

Fig. 5 is a cross-sectional view of a modified capseal;

Fig. 6 is a cross-sectional view of another modified capseal;

Fig. 7 is a modification of the capseal of Fig. 6;

Fig. 8 is a perspective view, partly in section, of still another capseal;

Fig. 9 is a side elevation of the capseal of Fig. 8 after the latter has been separated into a reusable cap portion and a band portion;

Fig. 10 is a cross-section of the reusable cap portion of Fig. 9;

Fig. 11 is a sectional view taken along the line 11—11 of Fig. 8;

Fig. 12 is a cross-sectional view of another capseal;

Fig. 13 is a bottom view of the capseal of Fig. 12;

Fig. 14 is a cross-sectional view of still another capseal; and

Fig. 15 is a bottom view of the capseal of Fig. 14.

In Fig. 1 there is shown an annular ring or gasket 1 extending transversely of the opening or orifice 2 of the annular wall 3 of a container neck. On its under side the ring 1 has three concentric annular projections or lips 4, 5 and 6 which rest on the top surface 7 of wall 3. The contact-making edge portions of the lips are shaped to conform to the rounded contour of top surface 7. It will be noted that lips 4 and 6 are relatively thin, whereas the lip 5 is heavier, the purpose of the latter construction being to prevent the spreading apart or excessive bending of the thin lips when pressure is applied to the ring in order to form the seal; that is to say, the lip or shoulder 5 will provide the main support for the ring when pressure is applied. The heavy lip rests approximately in the center of surface 7 while the thin lips rest nearer the edges of said surface; the latter lips touch the surface 7 at every point and are sufficiently resilient as to provide a tight seal therebetween. With the lip 5 they also provide what may be described as a pair of annular tunnels 8 and 9. In dotted outline at 10 is shown a cover for exerting pressure on the gasket to effect a seal. The cover has a depending annular side portion 11 at the lower edge of which is an annular bead 12 which engages an annular ring or groove 13 in the wall of the container.

In Fig. 2 is shown an annular ring or gasket 15 which is like the gasket 1 except that annular projections or lips are provided on the upper side as well as the under side of the gasket. Either side of this gasket may thus be placed in contact with the top surface of the annular wall of a container.

In Fig. 3 the sealing member is in the form of a disc 16 having annular lips like those shown on the gasket 1. As may be realized, disc 16 may have annular projections on its upper side as well as on its under side in the manner shown in Fig. 2. A cap such as cap 10 of Fig. 1 may be employed with the disc of Fig. 3 as well as with the ring of Fig. 2.

In Fig. 4 a cap or capseal 17 having a transversely extending part 18 and an annular side wall or skirt portion 19 is shown resting on the neck 20 of a bottle 21. The under side of the part 18 has a pair of annular lips 22, 23, the latter of which is of heavier construction. These lips function as the lips 4 and 5 of Fig. 1. Side wall 19 has an inwardly extending elongated bead 24 which engages the annular recess 25 on the outer side of annular wall 20, and by this means the capseal 17 is held firmly in place on the bottle neck and the requisite pressure is exerted on the lips 22 and 23 to provide a tight seal.

Fig. 5 shows a capseal 30 resting on and enclosing the neck 31 of a container, the neck being defined by flat surfaces 32, 33 and 34. The transverse part 35 of the capseal has three annular lips 36, 37 and 38 on its under side which make contact with the top surface 33 of the container neck wall. The lips are similar in construction to the corresponding lips of Fig. 1, except that the outer or free edges of the lips are flat, rather than curved, to fit the contour of surface 33. The capseal has an annular side wall or skirt portion 39 which is disposable around the surface 34 of wall 31, the lower peripheral edge of side wall 39 being outwardly flared as at 39a to some extent to facilitate capping of the container. The capseal 30 is held in place on the container neck by virtue of the close fit between side wall 39 and the wall 31.

Fig. 6 shows a capseal 40 seated on the annular wall 41 of a container neck 42. The capseal comprises a coaxial pair of spaced inner and outer annular skirt portions 43, 44 which enclose the annular wall 41 therebetween. The outer skirt portion has an inwardly projecting annular bead 45 on its inner side for engaging a corresponding groove 46 in the outer side of the neck wall. A transverse end portion 47 interconnects the two skirt portions and seats on the top surface 50 of wall 41. On the under side of the portion 47 a pair of concentric annular projections or shoulders 48, 49 are provided which make contact with surface 50. These projections have a saw-tooth cross-sectional shape and at least the contact-making edge portions of them are sufficiently resilient and/or compressible to provide a tight seal between them and the surface 50. An annular tunnel 51 is formed between the projections. As will be understood, the engagement between the bead 45 and groove 46 provides the necessary pressure on lips 48 and 49 to insure a tight seal. The skirt portion 43 merges at the bottom thereof into an inwardly convex cup-like or disc-like sealing portion 52 which extends across the skirt 43. The portion 52 preferably tapers in thickness from its periphery, generally indicated at 53, to its center 54. This sealing portion 52 is adapted, under the pressure increase which may occur in the container as a result of a sealing operation, to move relatively to the skirt portions 43 and 44 so as to approach an outwardly convex position and thereby apply the inner skirt portion against the inner periphery of the wall 41 and the outer skirt portion against the outer periphery of wall 41. As a result of this action, the capseal tends to become more firmly secured to the container neck as the pressure in the container increases.

The capseal 60 of Fig. 7 is similar to capseal 40 except that it is provided with a tamperproof band 61 integral with the outer skirt portion and extending downwardly from the same. The band is separated from the skirt portion by a weakened, horizontally extending line 62. A finger portion 63, defined by weakened lines 64, is provided on the band and may be grasped by the fingers after first tearing along the lines 64 to expose it. Band 61 is separable from the outer skirt portion by grasping the finger portion 63 and tearing the band horizontally along the weakened line 62. As will be realized the band 61 must be torn away from the capseal 60 before the latter is removed from the bottle. Following removal of the band, the capseal 60 is reusable as a capseal for the bottle. In Fig. 7, the cup-like sealing portion is shown as of uniform thickness.

In connection with Figs. 6 and 7, it will be understood that when the capseal is applied to the bottle, the pressure of gas or air entrapped between the portion 52 and the liquid level in the bottle, or later released from the liquid inside the bottle, will cause a movement or distortion of the portion 52 so that the latter may first flatten out and then approach an outwardly convex position. This movement of the portion 52 tends to force the inner and outer skirt portions against the sides of wall 41, thus bringing them into firmer contact therewith. The annular bead 45, as a result of the foregoing action, is pressed against groove 46 with greater force. It may be stated that the shape of the portion 52, and its distance from the top of the capseal, are variable. The foregoing effects of the movement of portion 52 would also be obtained if the outer surfaces of the wall of the neck were smooth rather than formed with groove 46, in which case the bead 45 could be omitted from the capseal. If desired, a cover or cap such as the cap 10 of Fig. 1, with or without the bead 12, may be placed over the capseals 40 or 60 to improve the overall appearance of the closure.

In Fig. 8 a capseal 70 is shown comprising a transverse part 71 having a skirt portion 72. The latter has an inwardly projecting annular bead 73 on its inner side adapted to engage a corresponding groove in the outer side of the wall of a container neck. The transversely extending portion 71 is adapted to seat on the top surface of the container neck wall, and on the under side of this portion is a pair of concentric annular projections 74, 75 of generally saw-tooth cross-section. These projections or shoulders are similar to those described in connection with Fig. 6. The capseal is provided with a tamperproof band 76 integral with the skirt portion and separated from it by a weakened line or strip 77 adjacent and below the bead 73. The band has a reenforced portion 78 integral therewith which at its upper end is connected to bead 73 and which extends to the lower edge of the band. The portion 78 has a ribbed outer surface, as shown. It is separated from the band by a pair of vertically extending lines or strips 79, 80 of weakened construction. A pull tab 81, integral with band 76, extends outwardly from the lower edge of the latter in a position offset with respect to the reenforced portion 78. One side edge 82 of the tab is preferably in alinement with the vertical weakened line 80. Band 76 is separable from the skirt portion by grasping the tab 81 and tearing the band vertically upwards along line 80 to the bead 73, then horizontally along the line 77 and around the skirt portion to the other vertical weakened line 79, and then vertically downwards along the latter line. The reenforced portion 78 is not removed during this action because of its strong connection to bead 72; that is, the tearing action takes place along the lines of least resistance. After removal of the band, the capseal is reusable as a capseal, and the reenforced portion 78 serves as a pull for the same. The part 71 of capseal 70 has a thickened central portion 83, which extends into the opening of a container, and surrounding portion 83 is a circular groove 84 in the upper side of the part 71.

In Fig. 9 the band 76 is shown detached from capseal 70 as a result of the tearing action described above. Capseal 70 as shown here is reusable. A modification of this capseal is shown in Fig. 10 wherein the annular projections or lips have relatively flat edges, as shown at 85, 86 as compared to the somewhat more pointed edges of the lips in Fig. 8.

In Figs. 12 and 13 a cap or capseal 90 is shown comprising a transversely extending portion 91 having side walls 92. On the under side of the part 91 a central portion 93 is provided about which is arranged a series of spaced, concentric annular projections 94 having a saw-tooth cross-sectional shape. At least some of projections 94 make contact with the container neck. Similar projections 95 are also provided on the inner surface of the side wall 92. Projections 94 and 95 are resilient at their points of contact with the bottle or container neck and thus serve to establish a tight seal between the cap and the bottle neck. Tunnels are formed between each pair of projections. The projections 94 and 95 also serve another purpose, namely, that of reenforcing and rigidifying the cap, particularly the part 91, thus enabling it to better withstand the effects of pressure or vacuum inside the container. The cap 96 of Figs. 14 and 15 is similar to the cap of Fig. 12 except that the annular projections 97 have a more or less square cross-sectional shape. Both caps 90 and 96 are designed to be press-fitted over the annular walls surrounding the opening of the containers. Both may be provided with a tamperproof band of the kind shown in Figs. 7 or 8.

In this connection the sealing members of Figs. 1 to 11 may have annular projections of the cross-sectional shape shown in Figs. 12 or 14.

The foregoing sealing members or elements are formed of plastic material by molding the elements as integral units. The plastic is odorless, tasteless and otherwise neutral to the material to be placed in the container. The capseals of Figs. 6 and 7 may also be formed of integral blanks which are centrally dished to provide the cup-like part 52, with the side walls of the dished part of the blank providing the inner skirt portion 43 while a peripheral part of the blank may be formed with a flange parallel to and spaced from the said side walls surrounding the dished portion in order to provide the outer skirt portion of the capseal. All of the sealing elements are permanently resilient and flexible at room temperatures, some more so than others depending on the thickness of the various parts of the constructions. Suitable resilient plastics, for example, include polyethylene, vinyl and acrylic resins, nylon, and the like. The tamperproof bands 61 and 76 are preferably thinner than their attached capseals to facilitate their removal from the capseals. Also, the capseal of Fig. 6 or 7 may be provided with the band of Fig. 8, the bead 45 of capseal 40 or 60 then having a reenforced portion attached thereto like the portion 78. Similarly, the capseal of Fig. 8 may be provided with the band shown in Fig. 7 and may or may not be provided with a portion like 78.

The tunnels or grooves formed between pairs of adjacent annular projections provide space into which the compressible and/or resilient material of the projection may move when pressure is applied to a sealing element.

All of the sealing elements, particularly the capseals of Figs. 6 to 10, are reusable after having once been removed from a container opening. Thus, for example, carbonated and other gas-containing or gas-generating liquids or fluids may be preserved in their original containers for indefinite periods, while being intermittently used, without loss of carbonation or gas during the time in which the capseals are in place on the containers. The capseals are readily applied and removed, and they may be applied either manually or by mechanical means. The sealing elements will also preserve against leakage the contents of a container which are under vacuum therein. As may be appreciated, all of these sealing elements are inexpensive to produce.

This application is a continuation-in-part of copending application Serial Number 170,786, filed June 28, 1950.

While the invention has been described in connection with specific embodiments of the same, it will be appreciated that it is capable of obvious variations.

In the light of the foregoing description, the following is claimed:

A reusable resilient capseal for a container having an opening defined by an annular wall, said capseal comprising a skirt portion having an inwardly projecting annular bead on its inner side for engaging a corresponding groove in the outer side of said annular container wall, a transverse end portion adapted to seat against the top surface of said annular container wall, spaced thick and thin concentric, annular projections on the underside of said transverse end portion, said projections terminating in lower free edges adapted to make contact with said top wall surface, said thin annular projection being longer than and located inwardly of the thick projection and, of substantially the same diameter as the inside of said annular wall and adapted to extend from said end portion further than said thick projection so that when said capseal is in use fluid pressure within said container tends to press said thin projection laterally against said container wall to provide a tight seal between said capseal and said top wall surface, and said thick annular projection adapted to support said capseal on said top surface and to protect said thin projection against deformation.

References Cited in the file of this patent

UNITED STATES PATENTS

| | | |
|---|---|---|
| 785,116 | Perry | Mar. 21, 1905 |
| 1,163,005 | Hall | Dec. 7, 1915 |
| 1,435,214 | Coombs | Nov. 14, 1922 |
| 1,819,036 | Oberhuber | Aug. 18, 1931 |
| 2,038,858 | Sacks | Apr. 28, 1936 |
| 2,102,673 | Brown | Dec. 21, 1937 |
| 2,116,938 | White | May 10, 1938 |
| 2,526,622 | Martin | Oct. 24, 1950 |
| 2,601,040 | Livingstone | June 17, 1952 |

FOREIGN PATENTS

| | | |
|---|---|---|
| 471,834 | Great Britain | A. D. 1936 |